(12) United States Patent
Poliwoda

(10) Patent No.: US 12,333,733 B2
(45) Date of Patent: Jun. 17, 2025

(54) COMPUTER-IMPLEMENTED METHOD FOR SEGMENTING MEASUREMENT DATA FROM A MEASUREMENT OF AN OBJECT

(71) Applicant: Volume Graphics GmbH, Heidelberg (DE)

(72) Inventor: Christoph Poliwoda, Heidelberg (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 414 days.

(21) Appl. No.: 17/778,798

(22) PCT Filed: Nov. 18, 2020

(86) PCT No.: PCT/EP2020/082537
§ 371 (c)(1),
(2) Date: May 20, 2022

(87) PCT Pub. No.: WO2021/099385
PCT Pub. Date: May 27, 2021

(65) Prior Publication Data
US 2022/0414890 A1    Dec. 29, 2022

(30) Foreign Application Priority Data
Nov. 21, 2019 (DE) .................. 10 2019 131 437.2

(51) Int. Cl.
*G06T 7/136* (2017.01)
*G06T 7/187* (2017.01)

(52) U.S. Cl.
CPC .............. *G06T 7/136* (2017.01); *G06T 7/187* (2017.01); *G06T 2207/10081* (2013.01); *G06T 2207/20092* (2013.01); *G06T 2207/30108* (2013.01)

(58) Field of Classification Search
CPC .................. G06T 7/136; G06T 7/187; G06T 2207/10081; G06T 2207/20092; G06T 2207/30108
(Continued)

(56) References Cited

U.S. PATENT DOCUMENTS

| 2004/0184647 A1* | 9/2004 | Reeves | ................... G06T 3/147 |
| | | | 382/131 |
| 2005/0213845 A1* | 9/2005 | Avinash | .................. G06T 7/194 |
| | | | 382/173 |

FOREIGN PATENT DOCUMENTS

| DE | 102006022103 A1 | 11/2007 |
| DE | 102009056467 A1 | 6/2011 |
| DE | 102018103714 A1 | 8/2019 |

OTHER PUBLICATIONS

German Patent Office, Office action for German Patent Application No. 10 2019 131 437.2, mail date Jul. 3, 2020.
(Continued)

*Primary Examiner* — Quang N Vo
(74) *Attorney, Agent, or Firm* — SoCal IP Law Group LLP; Angelo Gaz

(57) ABSTRACT

The invention relates to a computer-implemented method for segmenting measurement data from a measurement of an object, the object having at least one Material transition region, the measurement data generating a digital representation of the object having the at least one at least one material transition region, the digital object representation having a plurality of pieces of spatially-resolved image information of the object, the method comprising the following steps: determining the measurement data; segmenting at least two homogenous regions of the digital object representation; and determining the position of at least one material transition region between the at least two homogeneous regions. The invention thus provides an improved (Continued)

computer-implemented method for segmenting measurement data from a measurement of an object, which correctly detects material transitions from the measurement data of the object.

14 Claims, 3 Drawing Sheets

(58) Field of Classification Search
USPC .......................................................... 382/173
See application file for complete search history.

(56) References Cited

OTHER PUBLICATIONS

European Patent Office/ISA, International Search Report and Written Opinion for PCT Application No. PCT/EP2020/082537, mail date Feb. 24, 2021.

Kung-Hao Liang et al, "Adaptive scale fixing for multiscale texture segmentation", IEEE Transactions on Image Processing, vol. 15, No. 1, Jan. 1, 2006 (Jan. 1, 2006), p. 249-256.

Haitham Shammaa M et al, "Extraction of isosurfaces from multi-material CT volumetric data of mechanical parts", Solid and Physical Modeling, ACM, 2 Penn Plaza, Suite 701 New York NY 10121-0701 USA,Jun. 2, 2008 (Jun. 2, 2008), p. 213-220.

Adams, R. and Bischof, L.: Seeded Region Growing. In: IEEE Transactions on Pattern Analysis and Machine Intelligence, 16, 1994, 6, 641-647.

Japan Patent Office, Office Action issued for Japanese Patent Application No. 2022-529494, mail date Jan. 21, 2025, 3 pages.

Kung-Hao, Liang, et al., Adaptive scale fixing for multiscale texture segmentation, IEEE Transactions on Image Processing, 2006, vol. 15, No. 1, https://ieeexplore.ieee.org/document/1556642.

German Patent Office, Office action for German Patent Application No. 10 2019 131 437.2, mail date Nov. 12, 2024.

* cited by examiner

COMPUTER-IMPLEMENTED METHOD FOR SEGMENTING MEASUREMENT DATA FROM A MEASUREMENT OF AN OBJECT

RELATED APPLICATION INFORMATION

This patent claims priority from International PCT Patent Application No. PCT/EP2020/082537, filed Nov. 18, 2020, entitled, "COMPUTER-IMPLEMENTED METHOD FOR SEGMENTING MEASUREMENT DATA FROM A MEASUREMENT OF AN OBJECT", which claims priority to German Patent Application No. 10 2019 131 437.2, filed Nov. 21, 2019, all of which are incorporated herein by reference in their entirety.

The invention relates to a computer-implemented method for segmenting measurement data from a measurement of an object.

For quality assurance in order to determine whether objects which have been produced comply with the desired specifications, these objects are measured and are compared with the desired specifications. In this case, the measurement can be carried out as a dimensional measurement, for example. Dimensional measurements can be carried out, for example, by scanning various points of the surface of the object. Furthermore, it is possible to carry out computer tomographic measurements, for example, wherein the measurement data obtained thereby are analyzed. In this case, surfaces inside the objects can also be checked. In this case, the measurement data may be in the form of volume data, for example, or can be converted into volume data. In order to be able to distinguish different regions of the object from one another in the measurement data, the measurement data are segmented into different regions. This is of particular interest, for example, during visualization, reverse engineering, multi-component functional analysis and the simulation of materials and material properties. Furthermore, the measurement data can be preprocessed before carrying out the method. Artefact corrections, for example metal artefact, beam hardening or scattered radiation corrections based on the segmented geometry, and data filters, for example Gaussian or median filters, can be applied to the measurement data, for example.

However, the segmentation of volume data relating to multi-material measurement objects has hitherto not been able to be carried out satisfactorily since specific adaptations of the segmentation algorithms are required for each material transition between two specific materials. For example, when analyzing grayscale values, it is necessary to use lower threshold values for detecting material transitions between materials which have comparatively low grayscale values in the measurement data, than for detecting material transitions between materials which have comparatively high grayscale values in the measurement data. Therefore, there are no good prospects of segmenting these volume data on the basis of a global threshold value. In particular, if the measurement data have artefacts, many algorithms cannot correctly segment the different materials. Furthermore, a correct segmentation does not suffice to provide precise measurement results at all material transitions, that is to say to precisely determine the position of the material transitions.

The object of the invention can therefore be considered that of providing an improved computer-implemented method for segmenting measurement data from a measurement of an object, which method provides correct detection of material transitions from the measurement data relating to the object.

Main features of the invention are stated herein.

The invention provides a computer-implemented method for segmenting measurement data from a measurement of an object, wherein the object has at least one material transition region, wherein the measurement data are used to generate a digital object representation having the at least one material transition region, wherein the digital object representation has a multiplicity of spatially resolved image information items relating to the object, wherein the method has the following steps of: determining the measurement data; segmenting at least two homogeneous regions in the digital object representation; and determining the position of at least one material transition region between the at least two homogeneous regions.

The invention therefore separates the step of segmenting the regions of the different materials from the step of determining the material transition regions. In this case, regions in the object representation which are homogeneous are first of all determined in order to identify regions of different materials. The digital object representation may be two-dimensional or three-dimensional. Four-dimensional object representations are also conceivable if, in addition to the spatial dimensions, a time dimension is also considered.

In this case, a homogeneous region is understood as meaning a region which has a consistent material or a consistent material mixture. The image information may be, for example, grayscale values which are obtained from measurement data from a computer tomographic measurement during a dimensional measurement of an object.

Regions whose measurement data or image information is/are, for example, between two threshold values, for example an upper and a lower threshold value, that is to say in which the local measurement data are similar or have similar values, that is to say if a local similarity is high, are considered to be homogeneous. The image information relating to a homogeneous region the digital object representation can therefore have grayscale values within a narrow range of grayscale values in one example. The homogeneous regions are therefore not absolutely homogeneous, but rather may have fluctuations within a tolerance. The threshold values may be predefined or may be determined when determining the homogeneous regions. However, the homogeneity of the regions need not be defined by means of the grayscale values. In another example, regions having a fibrous material with a similar fiber orientation may also be considered to be homogeneous even if the grayscale values themselves are not homogeneous in this case. However, the pattern which is defined by the texture which results from the fibers is then homogeneous. The material of a region or of the entire object may be, for example, a mono-material, that is to say the material transitions in the material transition regions may then be in this example transitions between different material structures or a transition from the mono-material to the background.

In another example, the exact determination of the material transition regions in the step of determining the position of at least one material transition region between the at least two homogeneous regions may have a small search area in which the material transition regions are searched for. A coarse segmentation may then be optionally carried out before the step of segmenting at least two homogeneous regions in the digital object representation. The result of this coarse segmentation may be the detection of homogeneous regions, or regions of a similar texture. A further, more accurate segmentation may then be carried out in the step of segmenting at least two homogeneous regions in the digital object representation.

For example, material transition regions between the homogeneous regions can be determined if the local similarity is reduced. Otherwise, the relevant homogeneous regions are combined. In this case, a material transition region may have, for example, a material surface, two abutting material surfaces, a plurality of material transitions separated by narrow material regions or a transition of the inner structure of an individual material etc.

A material transition region may have, for example, a transition between biological materials, welded seams or regions of different fiber orientation. It is not necessary for the material transition region to have a clear material surface. In a further example, a material transition region can be approximated or represented as a surface both in measurements and in a CAD model.

Furthermore, the at least one material transition region may be a multi-material transition region, for example. The term multi-material relates not only to regions of a plurality of homogeneous individual materials. The presence of fibers or porosities may respectively also specify a separate material region even if the underlying material remains identical. Regions of different properties, in particular in the case of an identical or similar material composition, can also be explicitly interpreted as separate materials. The background of a CT scan, usually the air around the object, may likewise be a material in the measurement data.

That is to say, in addition to the image information representing a background of the object, the object comprises at least two materials in the measurement data for which the material transitions, for example surfaces, are determined.

According to a further example, the step of segmenting at least two homogeneous regions may have the following substeps of: determining at least two homogeneous regions in the measurement data and/or in the digital object representation; analyzing a local similarity of the multiplicity of spatially resolved image information items in order to obtain at least one expected position of a material transition region; adapting an extent of each homogeneous region until a border region of each homogeneous region is arranged at the at least one expected position of a material transition region; wherein the step of determining the position of at least one material transition region between the at least two homogeneous regions has the substep of: determining the position of the at least one material transition region in the at least one border region and preferably in the environment of the at least one border region.

In this example, different algorithms are used, wherein the algorithms investigate different forms of presentation of the measurement data. Using different algorithms with their respective advantages and disadvantages makes it possible to utilize the strengths of the algorithms used in the best possible way. For example, the image information from the measurement data can first of all be analyzed using one algorithm, wherein each image information item is compared with the locally adjacent image information items, for example. This can be referred to as pre-segmentation. Furthermore, this can be advantageously carried out on three-dimensional measurement data, for example. However, two-dimensional measurement data which can also be linked to the three-dimensional measurement data can also be used. Similar image information items are then combined to form a homogeneous region. At least one homogeneous region is determined in this manner. In this case, an algorithm on which the determination of the homogeneous region is based may be inaccurate, with the result that the borders of the homogeneous region do not coincide with the positions of the material transition regions which could border the homogeneous region. A further algorithm can be used to analyze the local similarity of the image information. The analysis of the local similarity can be used to determine regions in which the image information only slightly resembles adjacent image information. These regions can be identified as an expected position of a material transition region. In this case, the expected position may also result, for example, from the desired geometry of the object or from another representation of the measurement data. A border region of the homogeneous region is then adapted by means of a further algorithm, for example by shifting its position. The extent of the homogeneous region can be changed in this case. The position of the border region is adapted until the border region comprises an expected position of a material transition region. Disadvantages of individual algorithms can therefore be compensated for by using further algorithms. In this case, a border region is understood as meaning a section of the homogeneous region which borders the homogeneous region. In this case, the border region may have a predefined extent inside the homogeneous region. An environment of a border region is understood as meaning a section of the homogeneous region and a section of a region which is arranged outside the homogeneous region and directly adjoins the border region. Within the homogeneous region, the environment has a shorter extent than the homogeneous region without the border region.

In the example, regions having values which exceed a particular threshold value for the local similarity can be identified as material transition regions between different material regions in the representation of the local similarity. Regions which are bordered by the material transition regions are then completely assigned to that material which had the greatest proportion of this region after the pre-segmentation. In this case, it may also happen that a closed material transition region is not formed between the material regions. This can be closed, for example, by means of a morphological operation of "closing", in which the relevant material transition regions grow together and small regions in between are removed.

In a further example, a pre-segmentation can be alternatively or additionally carried out on a representation of the local similarity. In this case, watershed transformation or region growing methods can be used, for example. This produces contiguous regions. The representation of the local similarity may likewise be filtered or subjected to other operations in order to obtain more stable results. An example of this would be a Gaussian filter.

Furthermore, the analyzing of the local similarity may be based, for example, on a change sequence of the multiplicity of spatially resolved image information items and/or a local variance of the multiplicity of spatially resolved image information items.

If the image information is grayscale values, for example, the change sequence can represent the gradient of the spatially resolved grayscale values. If the homogeneous regions are based on textures, the local variance of the image information, for example, can be used to determine the local similarity. In this case, a gradient representation is preferably the absolute value of the local gradient. They indicate increased values in the vicinity of material transition regions.

In a further example, before segmenting at least two homogeneous regions, the method may also have the following steps of: aligning a digital representation of a desired geometry with the digital object representation; wherein at least two homogeneous regions in the measurement data and/or in the digital object representation are determined on the basis of the digital representation of a desired geometry.

The expected positions of the material transition regions, for example, can therefore be gathered from the desired geometry in order to obtain at least a rough pre-alignment of the measurement data. In this case, the desired geometry may be a CAD model of the object. The regions of the desired geometry or of the CAD model can then be assigned to the corresponding regions in the measurement data. The computer-implemented method can therefore resort to previous knowledge from the desired geometry when determining the position of the material transitions. This can be carried out as part of a pre-segmentation.

Alternatively or additionally, information relating to the geometry of the object from a measurement using another sensor, for example optical methods such as strip light projection, can also be used.

Furthermore, the aligning may comprise, for example, the following substeps of: determining a digital representation of the material transition regions of the object from the local similarity of the image information; and adapting the digital representation of the desired geometry and the digital representation of the material transition regions to one another.

In this example, the material transition regions of the object which are determined from the local similarity of the image information are adapted to the digital representation of the desired geometry in order to align the digital object representation. In this case, a representation of the local similarity of the grayscale values can first of all be calculated. This representation can indicate, for example by means of increased grayscale values, those regions in the measurement data in which a material transition region could be present, without providing more detailed information relating to the type of the respective material transition region. The representation determined by means of the local similarity can then be directly adapted to the CAD. Rough, but fast, alignment is possible in this manner.

Furthermore, the aligning may have, for example, the following substeps of: determining at least one portion of the material transition regions in the digital object representation; and adapting the digital representation of the desired geometry and the digital object representation to one another on the basis of the at least one portion of the material transition regions.

In this case, only one portion of the material transition regions is determined. The portion of the material transition regions can be determined in this case, for example, by means of an algorithm in which the material transition regions are determined, which determination may be rough, that is to say not necessarily all material transition regions are captured correctly. In this case, it may be sufficient for only the outer material transition regions of the object with respect to the air to be determined. This may be sufficient for a rough alignment. This determination of the material transition regions may be optionally carried out using a fast algorithm, for example Iso50, or on data of a reduced resolution, in order to save time. However, the local similarity may also be analyzed in order to determine the material transition regions. The alignment of the digital object representation with the desired representation is based only on a portion of the material transition regions in this example.

According to a further example, at least one part of a surface may be determined using a fast algorithm.

In this manner, a part of the surface may be determined in a relatively short time. This determined part of the surface may be used, for example, to quickly, roughly align the digital object representation, which is then followed, in a subsequent step, by a finer alignment, for example. Furthermore, the material transition regions can be determined more accurately after quickly determining the part of the surface.

According to one example, the segmenting of at least two homogeneous regions may have the following substep of: analyzing a frequency distribution of the multiplicity of spatially resolved image information items, wherein the frequency distribution is based on the frequency of identical image information items of the multiplicity of spatially resolved image information items relating to the object; and determining the at least two homogeneous regions on the basis of the frequency distribution.

If the image information is, for example, grayscale values, the frequency distribution is a grayscale value histogram. The typical grayscale values of the existing homogeneous regions are identified on the basis of an analysis of the frequency distribution. The typical grayscale values can be used to simplify the determination of the homogeneous regions. In this case, the grayscale value histogram may also be analyzed, possibly automatically, according to deflections which indicate a particular material, in order to identify the grayscale values of the individual materials. This can be automated, thus making it possible to avoid a waiting time for an input by a user. In particular, this may be relevant to evaluating a large number of measurements, for example during in-line operation. Identical image information items are in this case image information items which, for example as grayscale values, have the same value or are arranged in a range of grayscale values which is smaller than the range of grayscale values when determining the homogeneous regions.

In a further example, the segmenting of at least two homogeneous regions in the digital object representation may have the following substep of: analyzing the object representation for contiguous regions of identical image information items of the multiplicity of spatially resolved image information items relating to the object for the purpose of segmenting homogeneous regions; wherein a material is assigned to each homogeneous region.

In this example, the measurement data are automatically analyzed in order to identify contiguous regions with grayscale values which are homogeneous to the greatest possible extent, that is to say identical image information items. Conclusions on the typical grayscale values of the existing materials can be drawn from the determined contiguous regions. This information can be used as pre-segmentation during the segmentation. In this case, the grayscale value histogram may also be analyzed, possibly automatically, according to deflections which indicate a particular material, in order to examine the grayscale values of the volume with respect to contiguous grayscale value regions which are homogeneous to the greatest possible extent. This can be automated, thus making it possible to avoid a waiting time for an input by a user. In particular, this may be relevant to evaluating a large number of measurements, for example during in-line operation.

According to a further example, before segmenting at least two homogeneous regions in the digital object representation, the method may also have the following step of: creating a label field which defines the homogeneous regions by means of spatially resolved label values in the measurement data and/or the digital object representation; wherein at least one distance value of a distance field is assigned to each label value, wherein a distance value represents a distance to a nearest interface of a homogeneous region, and wherein the step of segmenting the digital object representation is carried out on the basis of the label field and the distance field.

A label field assigns a material to a location in the digital object representation. For this purpose, different values or ranges of values of the image information, for example grayscale values, can be assigned. For example, particular ranges which are between two threshold values in each case can be assigned to different materials. At the same time, the homogeneous regions are defined with the assignment. The label field implicitly represents the rough positions of the material transition regions. A distance value of a distance field is assigned in this case to each label value, wherein the distance value defines the shortest distance to a nearest interface of the relevant homogeneous region. The distance field represents the position of the surface. The definitive material transition regions of the different materials can be stored with subvoxel accuracy with the aid of a single distance field, possibly without a sign. In this case, the distance field can represent or store where surfaces are located. In this case, a label value can also be assigned to a plurality of distance values and can therefore be assigned to different homogeneous regions, for example in overlapping regions of the homogeneous regions. Together with the label field, it is possible to determine, for each region of the surface, what material transition region is involved. This can be indicated by the materials which are represented in an adjacent manner in the label field. Since the label field is often present anyway when determining the surface, a distance field is therefore a particularly efficient possible way of describing or storing this.

In a further example, the step of determining the position of at least one material transition region may have the following substeps of: providing a selection of different types of material transition regions by means of an input by a user and/or by means of an evaluation rule; and determining the position of material transition regions in the segmented digital object representation with a higher degree of accuracy than in the step of analyzing the local similarity, merely on the basis of the selected types of material transition regions.

The determination of the position of the material transition regions is therefore restricted to certain types of material transition regions which are defined by a user input, a corresponding matrix or an evaluation rule. Types of material transition regions which have not been selected and the positions of which are not needed are therefore not determined. This can save computing time/capacities.

A type of a material transition region is understood as meaning, for example, the transition between two particular materials or between two different material structures within a material. A type of a material transition may be, for example, the transition between PVC and steel.

According to a further example, the step of determining the position of at least one material transition region may have the following substeps of: providing regions in the digital object representation having required probe points by means of an input by a user and/or by means of an evaluation rule; providing a selection of material transition regions, the position of which needs to be determined, on the basis of the provided regions in the digital object representation having required probe points.

The determination of the position of the material transition regions is therefore restricted to regions in the object representation in which probe points are required according to the user input or evaluation rule, that is to say in which the determination of the position of the material transition regions is of interest. The regions in the object representation in which the positions of material transition regions are of interest may be manually transmitted for example, may be defined in an evaluation rule for example or may be derived from an evaluation rule, for example all material transition regions for which fitting points are required. Material transition regions in which no probe points are required are therefore excluded from the determination. This makes it possible to save further computing capacities.

After segmenting at least two homogeneous regions in the digital object representation, the method may also have, for example, the following step of: predefining types of material transition regions of geometry elements of the object which are to be adapted to the segmented digital object representation by means of an input by a user and/or by means of an evaluation rule; adapting geometry elements of the object to the segmented digital object representation on the basis of regions of the object representation or probe points in the object representation which have a predefined type of material transition region between the homogeneous regions.

Therefore, when adapting geometry elements, for example for the purpose of carrying out dimensional measurements, only probe points which are arranged in material transition regions of the type predefined by a user input or an evaluation rule are taken into account. An evaluation rule or a manual definition of geometry elements to be probed can define which materials can be expected in the material transition region being searched for. In this case, the orientation and therefore the arrangement of the respectively involved materials may also be taken into account. Only probe points in this material transition region are then set or a warning is output if probe points in differing material transition regions are set. This may optionally likewise be defined on the basis of individual probe points. Unnecessary adaptations of geometry elements are therefore avoided.

According to a further example, after segmenting at least two homogeneous regions of the digital object representation, the method may also have the following step of: adapting geometry elements of the object to the segmented digital object representation on the basis of material transition regions between the homogeneous regions; determining materials of the homogeneous regions in the material transition regions to which the geometry element is adapted; and outputting information relating to the determined materials of the homogeneous regions in the material transition regions with a result relating to the adaptation of the geometry element.

When adapting geometry elements, it is therefore determined which materials are involved in the determined material transition regions. This information may be output as part of the measurement result, for example as meta information.

The type of material transition region and the materials involved may be visualized in a color-coded manner, for example as a 3D/2D view of the measurement data or in a representation or list of the adapted geometry elements.

The invention also relates to a computer program product having instructions which can be executed on a computer and, when executed on a computer, cause the computer to carry out the method according to the preceding description.

Advantages and effects as well as developments of the computer program product result from the advantages and effects as well as developments of the method described above. Reference is therefore made to the preceding description in this respect. A computer program product can be understood as meaning, for example, a data storage medium which stores a computer program element which has instructions which can be executed for a computer. Alternatively or additionally, a computer program product may also be understood as meaning, for example, a permanent or volatile data memory such as a flash memory or a main memory which has the computer program element. However, further types of data memories which have the computer program element are not excluded thereby.

Further features, details and advantages of the invention emerge from the wording of the claims and from the following description of exemplary embodiments on the basis of the drawings, in which:

Figure 6A:
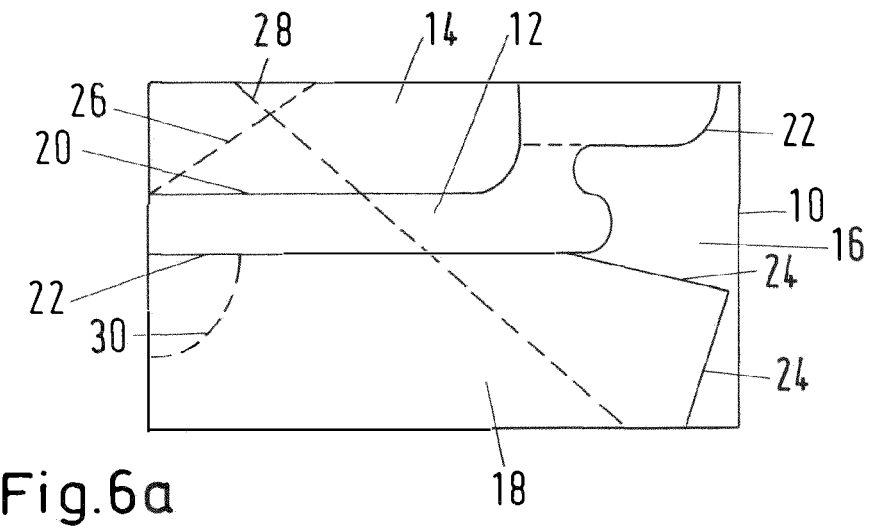
Figure 6B:
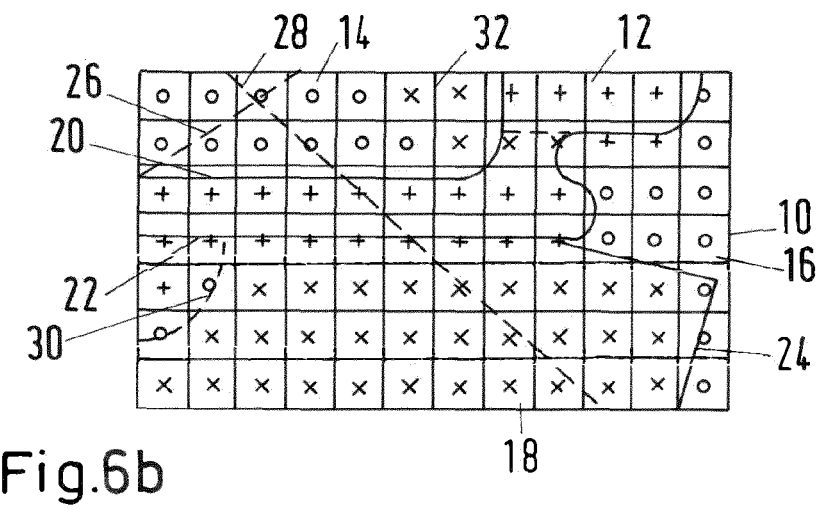
Figure 6C:
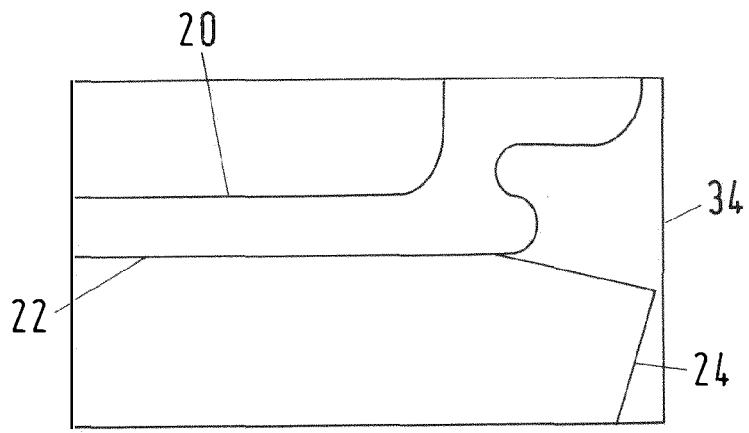
Figure 6D:
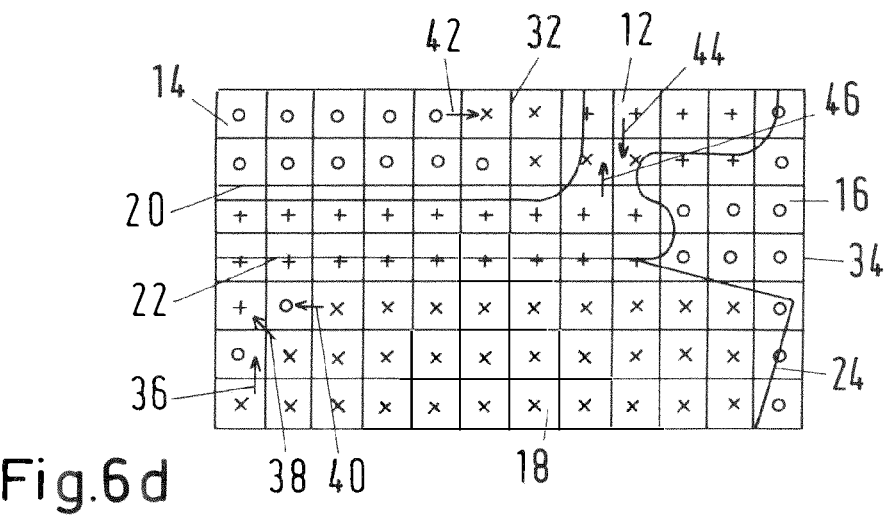
Figure 6E:
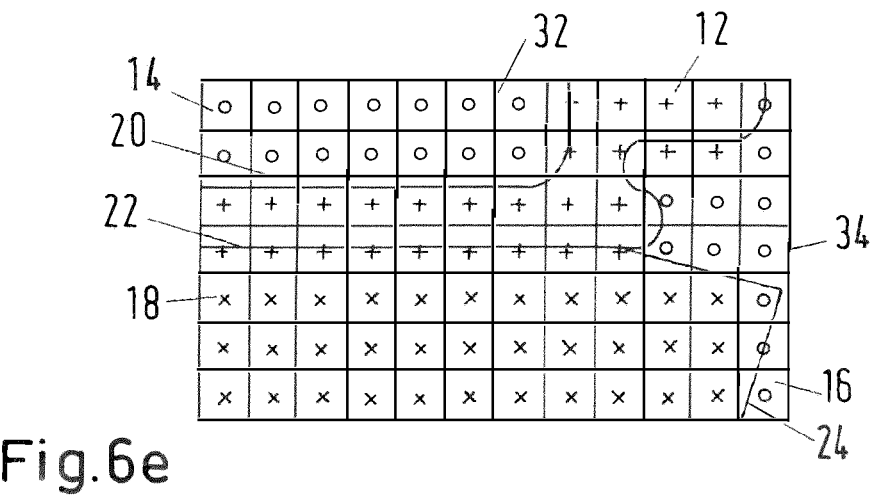
Figure 7:
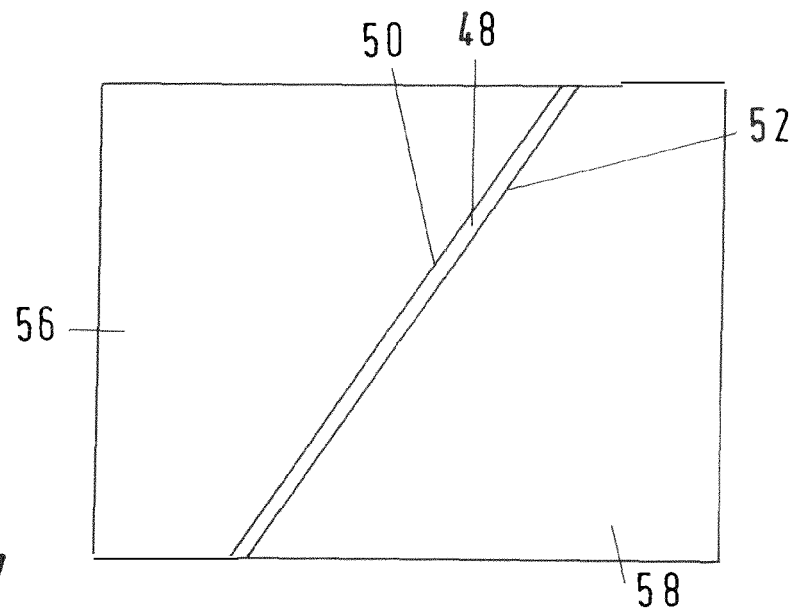

FIGS. 6a-e show a schematic illustration of a sequence of steps of an exemplary embodiment of the method; and FIG. 7 shows a schematic illustration of a multi-material transition region.

The computer-implemented method for segmenting measurement data from a measurement of an object denoted in its entirety with the following using the reference sign 100. The computer-implemented method 100 is first of all explained by means of FIG. 1.

Figure 1:
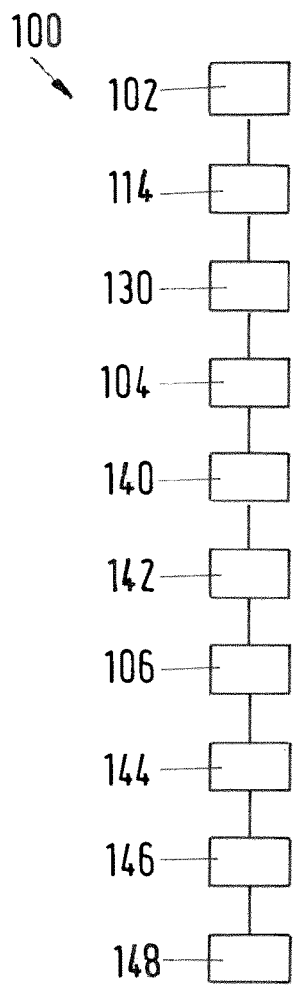
FIG. 1 shows a flowchart of the computer-implemented method.

FIG. 1 shows a flowchart of an embodiment of the computer-implemented method 100 for segmenting measurement data from a measurement of an object. In this case, the object has at least one material transition region.

In a first step 102, the measurement data relating to the object are determined. In this case, the measurement data can be determined, for example, by means of a computer tomographic (CT) measurement. However, other methods for determining the measurement data, for example magnetic resonance tomography etc., are not excluded thereby. The measurement data are used to generate a digital object representation having the at least one material transition region. The digital object representation comprises a multiplicity of spatially resolved image information items relating to the object.

If the measurement data are CT data, they need not necessarily consist of only a single grayscale value per voxel. They may be multimodal data, that is to say data from a plurality of sensors, or data from a multi-energy CT scan, with the result that a plurality of grayscale values are present for each voxel. Furthermore, results from analyses on the original measurement data can also be used as a further spatially resolved grayscale value in the method 100, for example the result of an analysis of the fiber orientation or of the local porosity. The additional information, which can be referred to as color channels for example, can therefore be interpreted like colored voxel data even though no colors of the visible spectrum are represented. This additional information can be advantageously used in the method 100.

In an optional step 114, a digital representation of a desired geometry of the object is aligned with the digital object representation from the determined measurement data according to step 102. The digital representation of a desired geometry of the object may be, for example, a CAD representation of the object which was created before producing the object. The geometry in the CAD model need not necessarily be described as a surface or material transition region. Instead or additionally, it may also be implicitly represented as a stack of images, a voxel volume or a distance field. This can be used during additive manufacturing, in particular. Furthermore, this information can be converted into a label field directly and without complicated conversion. However, further forms of representation of the desired geometry are not excluded thereby.

At least two homogeneous regions in the measurement data and/or in the digital object representation are determined on the basis of the digital representation of the desired geometry. Since the material transition regions and the components of the object or the regions of the object having homogeneous materials are known in the digital representation of the desired geometry, homogeneous regions in the measurement data or in the digital object representation which is generated from the measurement data can be inferred from the digital representation of the desired geometry after the aligning in step 114.

During the alignment, that is to say when adapting the geometric regions of the desired geometry to the measurement data, it is possible to take into account which materials are involved in the grayscale value transition and how they are arranged. The orientation of the material transition can emerge from the arrangement of the materials. This information is usually known in the desired geometry and can be locally easily determined from the measurement data in each case. This makes it possible to prevent material transition regions which do not match one another from being assigned to one another, which would result in incorrect alignment.

The alignment can also be carried out by means of a non-rigid mapping between the measurement data and the desired geometry.

In a further optional step 130, a label field, which defines the homogeneous regions by means of spatially resolved label values in the measurement data and/or in the digital object representation, can be created during an optional pre-segmentation.

The label field can be combined with a distance field with or without a sign. In this case, at least one distance value of the distance field is assigned to each label value. In this case, a distance value describes the distance to a nearest interface of the homogeneous region. A separate distance field can be created for each material.

The interfaces of the homogeneous region are arranged in the material transition regions. In this case, a label value can be assigned to a plurality of distance fields and can therefore be assigned to a plurality of distance values. That is to say, the material transition regions for each material in an object can each be represented by a separate distance field. The size of a homogeneous region can be recorded with little memory use and with little computing effort using a distance field.

In this case, it is possible to use previous knowledge which indicates, for example, that, of a particular material in the object, only contiguous regions of a volume of a specific size can occur in the measurement region. This can be taken into account when creating the label field by virtue of a contiguous region which is larger then not being assigned to this material. This reduces errors during segmentation.

For example, screws of a certain maximum size may be present in the measurement region. If a larger region is assigned to this material by the method at a point in the measurement volume, it can be determined in this manner that the assignment was presumably incorrect.

An alignment or registering with the desired geometry, for example a CAD model, can be carried out in principle in such a manner that material transition regions from the measurement are adapted to the corresponding material transition regions of the desired geometry. That is to say, that pose at which they match in the best possible manner is searched for. In this case, particular features of the geometries such as corners and edges can also be explicitly identified in order to find a suitable assignment. In this case, the user or the evaluation rule can select which materials, material transitions or components of the desired geometry should be taken into account and which should not. In addition, with the knowledge of the type of transition in the measurement data, an incorrect assignment and therefore incorrect registering can be prevented.

Any registering, for example between the measurement data and the desired geometry, can also be carried out in a non-rigid manner.

Furthermore, when creating a label field, the measurement data can be searched for known geometry elements, for example a screw, from a database. If a geometry element or a geometry element which is similar within predefined limits is identified in the measurement volume, the knowledge of the desired geometry can be used in the further evaluation by assigning the corresponding material label to the ranges of grayscale values in the pre-segmentation, for example, or adapting the associated desired geometry to the geometry element. Furthermore, alternatively or additionally, a corresponding evaluation plan can be automatically called up. In a further example, the object can be automatically identified or named in a scene tree. The search for known geometry elements from a database can also be carried out in further steps of the method 100.

In a further step 104, at least two homogeneous regions are segmented from the digital object representation. If an optional pre-segmentation has been carried out, step 104 may be referred to as main segmentation. In this case, homogeneous regions in the digital object representation are determined and delimited from one another. If a label field according to step 130 is used, step 104 is carried out on the basis of the label field and the distance field.

In step 104, information from other sensors can be used. When adapting the position of the material transition regions, the surface information obtained with these sensors is used to extend the material transition regions in this direction or to prevent material transition regions from being extended beyond the surfaces determined in this manner.

After step 104, step 140 can be optionally carried out. In step 140, material transition regions are predefined by virtue of geometry elements of the object being input by a user and/or being gathered from an evaluation rule. In this case, the geometry elements are intended to be adapted to the material transition regions of the segmented digital object representation. For example, a cylinder may be adapted to a cylindrical homogeneous region which is bordered by corresponding material transition regions.

In a further optional step 142, the geometry elements of the object are adapted to the segmented digital object representation. In this case, the predefined material transition regions which are arranged between homogeneous regions are searched for. The regions of the object representation or probe points in the object representation which have such predefined material transition regions are used to adapt the geometry elements of the object to the segmented digital object representation.

Furthermore, small cavities inside the material or material particles in the air may be identified in the measurement data and removed, for example, since they usually undesirable incorrect segmentations which result from noise. According to a further example, the segmented surface may be smoothed in order to minimize the influence of the noise. Such measures are conceivable after every step, in principle, and may help, inter alia, to improve the stability of the results and to reduce the required computing time in the subsequent steps.

In step 106, the position of at least one material transition region arranged between the at least two homogeneous regions is determined. In this case, the regions between two homogeneous regions are determined from the segmented digital object representation. The positions of the material transition regions are assumed and determined to be in these regions between the two homogeneous regions.

In steps 130, 104 and 106, different measurement data can be used. Different measurement data, for example a different volume dataset obtained from MRT or ultrasound, for example, can be performed in the pre-segmentation in step 130 and the main segmentation can be performed on CT data. However, it is necessary for the datasets of the different modalities to be aligned with one another for this purpose.

As an alternative or in addition to steps 140 and 142, geometry elements of the object may be adapted to the segmented digital object representation on the basis of material transition regions between the homogeneous regions in a further optional step 144. In this step, in contrast to step 140, material transition regions determined from determining the position of at least one material transition region between the at least two homogeneous regions in step 106 are used rather than predefined material transition regions.

In a subsequent further optional step 146, the materials of the homogeneous regions at the material transition regions to which the geometry element is adapted are determined. This can be carried out, for example, by means of the image information. If the image information is grayscale values, particular ranges of grayscale values can be assigned to particular materials. This makes it possible to determine materials in the homogeneous regions.

In a further optional step 148, information relating to the determined materials in the homogeneous regions at the material transition regions is output as meta information of a result relating to the adaptation of the geometry element. The information relating to the determined materials can be compared with previous knowledge of the object. For example, a particular material may be provided for a particular geometry element in the object. The determined material for the corresponding geometry element should then be the same material. In the event of discrepancies, incorrect adaptations or faults in the production of the object can be determined.

Figure 2:
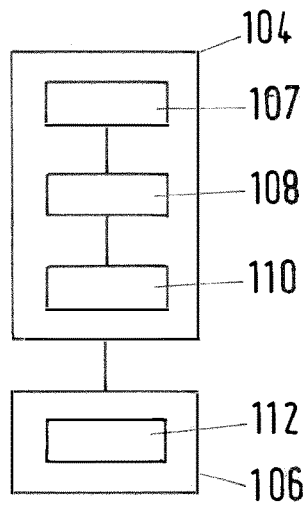
FIG. 2 shows a flowchart with substeps of an exemplary embodiment of the segmenting step.

FIG. 2 illustrates optional substeps of step 104 and step 106. A first optional substep 107 comprises determining at least two homogeneous regions in the measurement data and/or in the digital object representation. For this purpose, the image information is analyzed in order to determine whether there are homogeneous regions, for example regions within a range of grayscale values or with a similar texture.

In a further optional substep 108, the local similarity of the multiplicity of spatially resolved image information items is analyzed. In this case, a change sequence of the multiplicity of spatially resolved image information items can be analyzed, for example. Alternatively or additionally, a local variance of the multiplicity of spatially resolved image information items can be analyzed. The local variance can be calculated more quickly and more robustly at multi-material transition regions than the use of change sequences. Expected positions of the material transition regions between different components of the object can be determined from the local similarity. These expected positions of the material transition regions are the positions of expected borders of the homogeneous regions determined in substep 107.

In a further optional substep 110, the homogeneous regions are then adapted. For this purpose, the extent of each homogeneous region is changed, with the result that a border region of each homogeneous region is arranged at the expected position of a material transition region. The expected positions of the material transition regions therefore border the homogeneous regions in the object representation.

In a further optional substep 112 of step 106, the position of at least one material transition region in the at least one border region according to substep 110 is determined. In this case, the environment of the at least one border region may also be included when determining the position of the at least one material transition region. Since the border region is arranged at an expected position of a material transition region, the search radius for the at least one material transition region is limited to the border region or to the border region and its environment.

Alternatively or additionally, the pre-segmentation may already be performed on a representation of the local similarity. Watershed transformation or region growing methods, for example, can be used in this case. This produces contiguous regions. The representation of the local similarity may likewise be filtered or subjected to other operations in order to obtain more stable results. An example of this would be a Gaussian filter.

In a further optional substep of this variant of the pre-segmentation, these contiguous regions can then be assigned to specific material by analyzing, for example, the image information, which is associated with the regions and may be in the form of grayscale values, in the original measurement data.

Further pre-segmentation methods may model a location-dependent electrical resistance in the volume, for example on the basis of the gradient of image information which is present as grayscale values for example. A small starting region is then defined for each material or for each component. This may also be carried out with the aid of a region-of-interest template or a desire geometry, for example a CAD representation. The potential lines form a good estimation of the material transition regions, in particular in biological structures.

Algorithms trained using machine learning can also be used for the pre-segmentation. Furthermore, previous knowledge determined by other modalities or sensors, for example by multi-sensors, can be alternatively or additionally used in the pre-segmentation.

The result of the pre-segmentation is a preliminary label field, possibly including distance fields.

The label field and/or, independently thereof, the distance field may be stored in varying resolutions for the purpose of increasing the accuracy or reducing the volumes of data. If necessary, additional distance fields or a description of the local normal direction within a normal field may be added in order to be able to describe corners and material transition regions in which many materials meet in more detail. A criterion for a higher resolution being required, possibly locally, may be, for example, the presence of corners and multiple edges or the meeting of a plurality of materials or a severe change or spatial variation in the normal field.

Figure 3:
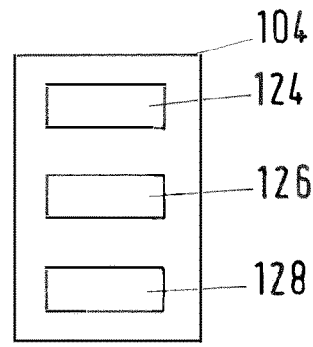
FIG. 3 shows a flowchart with substeps of a further exemplary embodiment of the segmenting step.

FIG. 3 shows a further exemplary embodiment of step 104 which can be alternatively or additionally used. In this case, step 104 comprises the optional substep 124 in which a frequency distribution of the multiplicity of spatially resolved image information items is analyzed. In this case, the frequency distribution is based on the frequency of identical image information items of the multiplicity of spatially resolved image information items relating to the object. This may be a histogram of the image information, for example. If the image information is grayscale values, for example, this is a grayscale value histogram. In this case, identical image information items would be grayscale values of different positions of the digital object representation with the same value.

In a further optional substep 126, the at least two homogeneous regions are determined on the basis of the frequency distribution. If different materials have different ranges of grayscale values, for example, a range of grayscale values for a particular material can be derived from the grayscale value histogram. The homogeneous regions can then be determined by means of these determined ranges of grayscale values.

In a further optional substep 128 which can be used as an alternative or in addition to substeps 124 and 126, the object representation is analyzed for contiguous regions of identical image information items of the multiplicity of spatially resolved image information items relating to the object. The analysis is used to segment the homogeneous regions and to assign material to each homogeneous region. As a result of the contiguous regions of identical image information items being determined, at least the contiguous regions are already homogeneous. Analyzing the different contiguous regions makes it possible to merge a plurality of contiguous regions which have similar image information.

Figure 4:
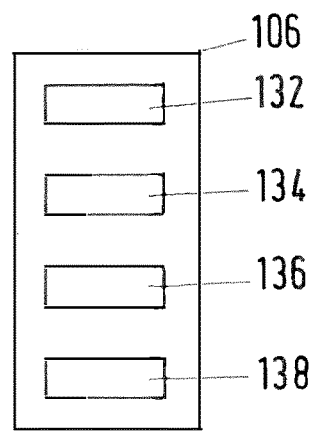
FIG. 4 shows a flowchart with substeps of an exemplary embodiment of the determining step.

FIG. 4 illustrates an embodiment of step 106. In an optional substep 132, a selection of different types of material transition regions is provided. The provision may be carried out by means of an input by a user and/or by means of an evaluation rule. The selection of types of material transition regions makes it possible to provide specified material transition regions which are of interest when checking the quality of an object, for example.

In a further optional substep 134, at least the positions of the selected types of material transition regions can be determined after substep 132. In this case, the positions are determined with a very high degree of accuracy. In this case, the accuracy is higher than in substep 108 which was described above. However, it is not necessary in this case for substep 108 to be carried out beforehand, that is to say substeps 134 and 108 may be carried out alternatively or in combination. If only the positions of the selected types of material transition regions are determined with increased accuracy, it is possible to save computing time since the positions of the remaining material transition regions are not determined or are not determined with increased accuracy.

In an alternative or additional optional substep 136 of step 106, regions in the digital object representation having required probe points can be provided. These regions may be provided by means of an input by a user and/or by means of an evaluation rule. The provided regions having the required probe points may be of interest when checking the quality of an object, for example.

In a further optional substep 138, it is possible to select and provide material transition regions which are arranged in or at the provided regions of the digital object representation in which probe points are required and the position of which is intended to be determined. This substep makes it possible to save computing time since material transition regions are selected and provided only in the regions in which probe points are required. It is possible to dispense with determining the position of material transition regions in other regions in which no probe points are required.

Figure 5:
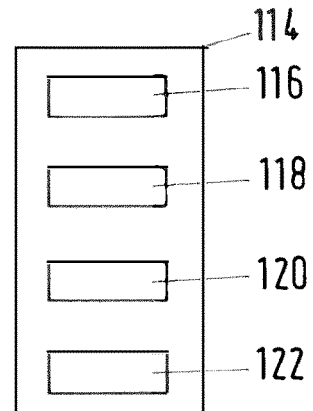
FIG. 5 shows a flowchart with substeps of an exemplary embodiment of the aligning step.

FIG. 5 shows an embodiment of step 114. In an optional substep 116, a digital representation of the material transition regions of the object can be determined from the local similarity of the image information. For example, material transition regions may be assumed to be in regions of the digital object representation if the local similarity of the image information is lower in these regions than outside said regions.

In a further optional substep 118, the digital representation of the desired geometry and the digital representation of the material transition regions can be adapted to one another after substep 116. Since the material transition regions may have, inter alia, surfaces or material borders of the object which are likewise present in the desired geometry, the material transition regions may be aligned with the surfaces or material borders present in the desired geometry. Therefore, the measurement data in the form of the digital object representation may be at least roughly aligned with the desired geometry.

In a further optional substep 120 which can be carried out as an alternative or in addition to substeps 116 and 118, at least one portion of the material transition regions in the digital object representation may be determined. This portion of the material transition regions may be used, in a further substep 122, to adapt the digital representation of the desired geometry and the digital object representation to one another. For the alignment of the digital object representation with the desired geometry, it is therefore not necessary to know or determine all material transition regions. Only a portion of the material transition regions may be necessary, for example the outer surfaces of the object, in order to align the measurement data in the form of the digital object representation with the desired geometry.

Optional step 130 and some further steps of the method 100 are explained in more detail below using FIGS. 6a to 6e which illustrate a use of a label field in connection with the method 100. In this case, FIG. 6a schematically shows a digital representation 10 of image information from measurement data relating to a section of an object. This schematic digital object representation may be, for example, a sectional representation of a computer tomographic measurement. In this case, the image information may be grayscale values which, for reasons of clarity, are not illustrated as grayscale values in FIG. 6a. Only transition regions in which the grayscale values change greatly are illustrated as lines.

The object has the subregions 12, 14, 16 and 18, the image information of which respectively forms homogeneous regions. The subregion 12 is delimited from the subregion 14 by means of the material transition region 20. The subregion 12 is delimited from the subregions 16 and 18 by means of the material transition region 22. The material transition region 24 is arranged between the subregion 16 and the subregion 18. However, in the digital representation 10 of the image information, the transition regions 26, 28 and 30 can also be seen, but result from shadowing or other artefacts and are not material transition regions.

In this case, conventional algorithms have problems with distinguishing the transition regions 26, 28 and 30 from material transition regions 20, 22 and 24. Therefore, it is possible to initially carry out an optional pre-segmentation in which the image information is analyzed.

In this case, FIG. 6b illustrates the representation 10 of the image information from FIG. 6a with a grid as a label field 32. The label field 32 may have any desired resolution and may be, for example, rougher than the resolution of the voxels or pixels, may have voxel/pixel accuracy or sub-voxel/subpixel accuracy. The label field 32 and/or the distance field will in most cases have the same structure and resolution as the measurement data. However, a lower resolution and therefore larger cells, or an anisotropic resolution and therefore cuboids instead of cubes, can be selected, for example. Furthermore, the structure can also be adapted, for example tetrahedrons instead of cubes. In addition, it is not absolutely necessary to make it possible to represent the material transition regions with subvoxel accuracy with the aid of one or more distance fields. This may become necessary only when or after determining the position of the material transition regions. Therefore, computing time and storage space can be saved if work is carried out only on the label field during segmentation and distance fields are used only when determining the positions of the material transition regions.

If the image information is grayscale values, for example, grayscale values below a certain threshold value can be assigned to a first material, for example air, which is indicated with the label "o" in FIG. 6b. Grayscale values above a further threshold value are assigned to a second material which is illustrated with the label "+" in FIG. 6b. Grayscale values which are between the two threshold values can be assigned to a third material which is indicated with the "x" in FIG. 6b.

The label field can be combined with a distance field.

Furthermore, the information from the desired geometry relating to the individual parts of the object, for example in the case of connectors having numbered pins 1-9, can be used to obtain information relating to the respective materials. Therefore, regions of the same material can also be divided among different parts of the object. In this manner, the practice of evaluating the measurement data becomes clearer. Ideally, the regions are listed or indicated in a hierarchical structure already defined in the desired geometry.

In a similar manner, the regions of the same material which are separated or are not connected in the label field can also be automatically divided into different parts.

In a next step according to FIG. 6c, a representation 34 which is obtained from analyzing the local similarity of the image information is determined. This may be a gradient representation, for example. Here, the material transition regions 20 and 22 and 24 are clearly discernible. The transition regions 26 to 30 cannot be seen in this representation. However, in contrast to the representation 10 of the image information, the individual subregions of the object cannot be qualitatively distinguished from one another. That is to say, the material of a subregion cannot be inferred from the representation according to FIG. 6c.

The representation 34 is linked to the label field 32, as is illustrated by way of example in FIG. 6d. In this case, it becomes discernible that the homogeneous regions are not bordered by the material transition regions 20, 22 and 24 in all sections. The borders of the homogeneous regions are therefore shifted during a main segmentation according to step 104, which is used when carrying out optional step 130, by relabeling homogeneous regions, for example from "o" to "x" at the arrows 36 and 40 and from "+" to "x" at the arrow 38. The region which had the label "o" at the arrows 36 and 40 has disappeared in FIG. 6e and now belongs to the region with the label "x". The region with the label "+" was reduced at the arrow 38 and the region with the label "o" was increased. A similar process takes place at the arrows 42, 44 and 46. At the arrows 46 and 44, two previously separate homogeneous regions with the label "+" grow together, wherein a region with the label "x" disappears.

Alternatively or additionally, individual regions which belong to one material can be marked in the digital object representation in order to create the label field. The marking is intelligently automatically extended to the next material transition region. It is also possible to allow a material transition region to be indicated by a user and to be automatically increased until the material transition region collides with other material transition regions, for example, with the result that the user is not forced to indicate a complete material transition region. Accurate marking is therefore not necessary. Furthermore, operations such as opening, closing, erosion and dilatation, an inversion, Boolean operators or smoothing tools such as filters can be used to process the regions in the label field.

Furthermore, it is possible to highlight regions in which material transition regions are present in a user's opinion. In this case, anchor points can be set, wherein the processing can be carried out as a material transition region and, as it were, as meta-information, or the image information is directly changed in the representation of the local similarity.

Alternatively, defective material transition regions can also be removed or weakened. After processing, the label field is recalculated on this basis. In this case, it is also possible to output a warning if no meaningful material transition region can be found at the location defined by the user.

A surface-based determination of a local data quality can also be used. In this case, a quality value representing the accuracy of the material transition region can be assigned to each material transition region.

The representation of the local similarity can be calculated from the measurement data, in particular from volume data, using different methods. For example, a Sobel operator, a Laplace filter or a Canny algorithm can be used. The choice of which algorithm is used and how it is parameterized can be manually made by the user. For example, that algorithm which produces the best results when creating the label field can be selected on the basis of a preview image. In addition, the representation of the local similarity can be processed by means of filtering before adapting the label field in order to achieve the best possible results. An example would be the use of a Gaussian filter in order to minimize the negative influence of noise on the result when adapting the label field.

Depending on the algorithm, it is possible for even smaller regions to be incorrectly segmented after the label field has been adapted. In order to rectify this, substeps can optionally also be carried out.

In this case, morphological operators such as opening and/or closing can be applied to the individual material regions, thus removing small regions.

Furthermore, contiguous regions below a defined maximum size can be deleted and can be assigned to the surrounding material(s). Regions which are surrounded by two or more other materials can optionally be provided with a differing or larger maximum size or cannot be deleted at all, whereas regions which are surrounded only by one other material can still be treated with the above-mentioned maximum size. In this manner, thin layers of a material between two further materials can be retained, for example.

FIG. 6e shows the result of the main segmentation. Here, the borders of the label fields correspond approximately to the material transition regions 20, 22 and 24. The components or materials 12, 14 and 16 are therefore segmented.

The material transition regions which can represent a local surface, for example, are calculated with greater accuracy on the basis of the adapted label field. A further algorithm specialized for this can be used for this purpose. In this case, the exact position of the material transition region is searched for in a small surrounding area, for example a few voxels. This is usually the prerequisite for exact dimensional measurements which are intended to be carried out on CT data.

Different algorithms may, in principle, be used for this purpose, for example algorithms which work directly on the measurement data. They can determine the local position of the surface, for example by means of a local or global threshold value or by searching for the maximum gradient or for a turning point of the grayscale value profile.

Furthermore, the exact local position of the material transition regions can be determined, for example, in the representation of the local similarity or the gradient or variance representation by adapting a second-degree polynomial to the grayscale value profile, for example. The position of the extremum of this polynomial can be used as the position of the surface.

However, further algorithms are not excluded by the explanations stated above.

The knowledge of the, possibly approximate, direction of a surface normal, of a surface arranged in the material transition region or of the materials arranged in the material transition region can be derived from the label field and the representation implicitly stored therein. This knowledge can be used by some algorithms to achieve more exact results. This knowledge, if available, can also be alternatively gathered from the desired geometry, for example a CAD model.

This is then carried out in combination with an algorithm which requires or can use the information relating to a starting surface to calculate the exact position of the surface on the basis thereof.

Furthermore, cone beam artefacts, sampling artefacts and noise can be reduced before or after creating the label field.

FIG. 7 shows an example of a multi-material transition region. In this case, the materials 48, 54 and 56 are illustrated in FIG. 7. In this case, the material 48 is arranged between the materials 54 and 56 and has a very short extent in comparison with the other two materials. The material transition region 52 is arranged between the material 48 and the material 54. The material transition region 50 is arranged between the material 48 and the material 56. Overall, the two material transition regions 50 and 52 form a multi-material transition region which can be resolved only with difficulty using conventional methods. Conventional segmentation methods generally detect such regions as merely one material transition region. However, a plurality of material transition regions which are very close together can be detected using the computer-implemented method 100 of the invention described above.

The invention is not restricted to one of the embodiments described above, but rather can be modified in various ways. In particular, the exemplary embodiments described above can be combined with one another. The steps of the method 100 may also be carried out in any desired order, if logically possible.

All of the features and advantages emerging from the claims, the description and the drawing, including design details, spatial arrangements and method steps, can be essential to the invention both alone and in a wide variety of combinations.

The invention claimed is:

1. A computer-implemented method for segmenting measurement data from a computer tomographic measurement of an object, wherein the object has at least one material transition region between two specific materials, wherein the measurement data are used to generate a digital object representation having the at least one material transition region between two specific materials, wherein the digital object representation has a multiplicity of spatially resolved image information items relating to the object, wherein the method has the following steps of:
  determining the measurement data;
  segmenting at least two homogeneous regions in the digital object representation; and
  determining the position of at least one material transition region between the at least two homogeneous regions;
  before segmenting at least two homogeneous regions in the digital object representation, the method has the following step of:
    creating a label field which defines the homogeneous regions by means of spatially resolved label values in the measurement data and/or the digital object representation;
  wherein at least one distance value of a distance field is assigned to each label value,
  wherein a distance value represents a shortest distance to a nearest interface of a homogeneous region, and
  wherein the step of segmenting the digital object representation is carried out on the basis of the label field and the distance field.

2. The method as claimed in claim 1, wherein the at least one material transition region is a multi-material transition region.

3. The method as claimed in claim 1, wherein the step of segmenting at least two homogeneous regions has the following substeps of:
  determining at least two homogeneous regions in the measurement data and/or in the digital object representation;
  analyzing a local similarity of the multiplicity of spatially resolved image information items in order to obtain at least one expected position of a material transition region;
  adapting an extent of each homogeneous region until a border region of each homogeneous region is arranged at the at least one expected position of a material transition region;
  wherein the step of determining the position of at least one material transition region between the at least two homogeneous regions comprises the substep of:
    determining the position of the at least one material transition region in the at least one border region and preferably in the environment of the at least one border region.

4. The method as claimed in claim 3, wherein the analyzing of the local similarity is based on a change sequence of the multiplicity of spatially resolved image information items and/or a local variance of the multiplicity of spatially resolved image information items.

5. The method as claimed in claim 1, wherein, before segmenting at least two homogeneous regions, the method also has the following steps of:
  aligning a digital representation of a desired geometry with the digital object representation;
  wherein at least two homogeneous regions in the measurement data and/or in the digital object representation are determined on the basis of the digital representation of a desired geometry.

6. The method as claimed in claim 5, wherein the aligning has the following substeps of:
  determining a digital representation of the material transition regions of the object from the local similarity of the image information; and
  adapting the digital representation of the desired geometry and the digital representation of the material transition regions to one another.

7. The method as claimed in claim 5, wherein the aligning has the following substeps of:
  determining at least one portion of the material transition regions in the digital object representation; and
  adapting the digital representation of the desired geometry and the digital object representation to one another on the basis of the at least one portion of the material transition regions.

8. The method as claimed in claim 1, wherein the segmenting of at least two homogeneous regions has the following substeps of:
  analyzing a frequency distribution of the multiplicity of spatially resolved image information items, wherein the frequency distribution is based on the frequency of identical image information items of the multiplicity of spatially resolved image information items relating to the object; and
  determining the at least two homogeneous regions on the basis of the frequency distribution.

9. The method as claimed in claim 1, wherein the segmenting of at least two homogeneous regions in the digital object representation has the following substep of:
  analyzing the object representation for contiguous regions of identical image information items of the multiplicity of spatially resolved image information items relating to the object in order to segment homogeneous regions;
  wherein a material is assigned to each homogeneous region.

10. The method as claimed in claim 1, wherein the step of determining the position of at least one material transition region has the following substeps of:
  providing a selection of different types of material transition regions by means of an input by a user and/or by means of an evaluation rule; and
  determining the position of material transition regions of the segmented digital object representation with a higher degree of accuracy than in the step of analyzing the local similarity as claimed in claim 3, only on the basis of the selected types of material transition regions.

11. The method as claimed in claim 1, wherein the step of determining the position of at least one material transition region has the following substeps of:
  providing regions in the digital object representation having required probe points by means of an input by a user and/or by means of an evaluation rule;
  providing a selection of material transition regions, the position of which needs to be determined, on the basis of the provided regions in the digital object representation having required probe points.

12. The method as claimed in claim 1, wherein, after segmenting at least two homogeneous regions in the digital object representation, the method also has the following step of:
  predefining types of material transition regions of geometry elements of the object which are to be adapted to the segmented digital object representation by means of an input by a user and/or by means of an evaluation rule;
  adapting geometry elements of the object to the segmented digital object representation on the basis of regions of the object representation or probe points in the object representation which have a predefined type of material transition region between the homogeneous regions.

13. The method as claimed in claim 1, wherein, after determining the position of at least one material transition region between the at least two homogeneous regions, the method also has the following step of:
   adapting geometry elements of the object to the segmented digital object representation on the basis of material transition regions between the homogeneous regions;
   determining materials of the homogeneous regions at the material transition regions to which the geometry element is adapted; and
   outputting information relating to the determined materials of the homogeneous regions at the material transition regions with a result relating to the adaptation of the geometry element.

14. A non-transitory computer memory encoded with executable instructions representing a computer program that can cause a computer to carry out the method according to claim 1.

* * * * *